United States Patent [19]

Lobb et al.

[11] 3,826,557

[45] July 30, 1974

[54] ILLUMINATING AND IMAGING SYSTEM FOR OPTICAL PROBE

[75] Inventors: Daniel Richard Lobb, Farnborough; Archer Michael Spooner, Henley-on-Thames, both of England

[73] Assignee: Redifon Limited, London, England

[22] Filed: Dec. 4, 1972

[21] Appl. No.: 311,505

[30] Foreign Application Priority Data

Jan. 20, 1972 Great Britain ..................... 2834/72

[52] U.S. Cl. ..................................... 350/17, 350/91

[51] Int. Cl. ........................................... G02b 23/00

[58] Field of Search ........... 350/17, 91; 352/49, 200

[56] References Cited

UNITED STATES PATENTS

| | | | |
|---|---|---|---|
| 2,008,938 | 7/1935 | Tolhurst | 352/49 X |
| 2,244,687 | 6/1941 | Goldsmith et al. | 352/49 |
| 2,244,688 | 6/1941 | Goldsmith et al. | 352/49 |
| 3,183,347 | 5/1965 | Coelho | 350/17 X |
| 3,517,980 | 6/1970 | Petran et al. | 350/17 |

*Primary Examiner*—David H. Rubin

*Attorney, Agent, or Firm*—Larson, Taylor & Hinds

[57] ABSTRACT

An optical imaging system, particularly for use with an optical probe moved over and viewing an illuminated terrain model for providing a visual display for flight simulation apparatus. General illumination is provided over the whole terrain model area together with strobed illumination of areas close to the probe. Cyclically and in phase with the strobed illumination, when it is on, the aperture of the optical system is reduced or the system is re-focused, to provide better focus of the near areas when the strobed illumination is on.

Additionally, model lights simulating terrain lights may be strobed similarly to provide better image definition thereof.

11 Claims, 4 Drawing Figures

PATENTED JUL 30 1974

3,826,557

SHEET 1 OF 3

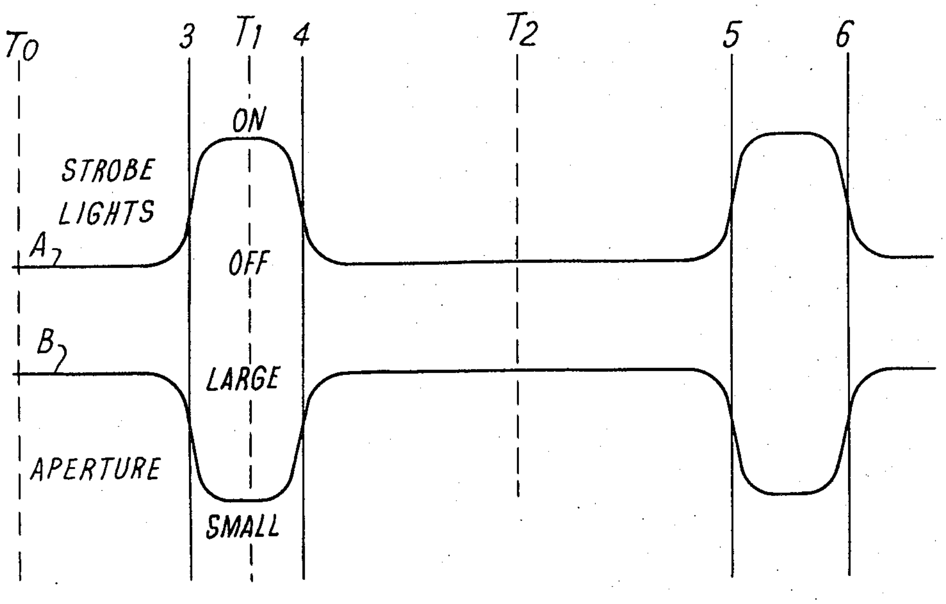
FIG. 3 OPERATION OF STROBE LIGHTS APERTURE REDUCTION METHOD
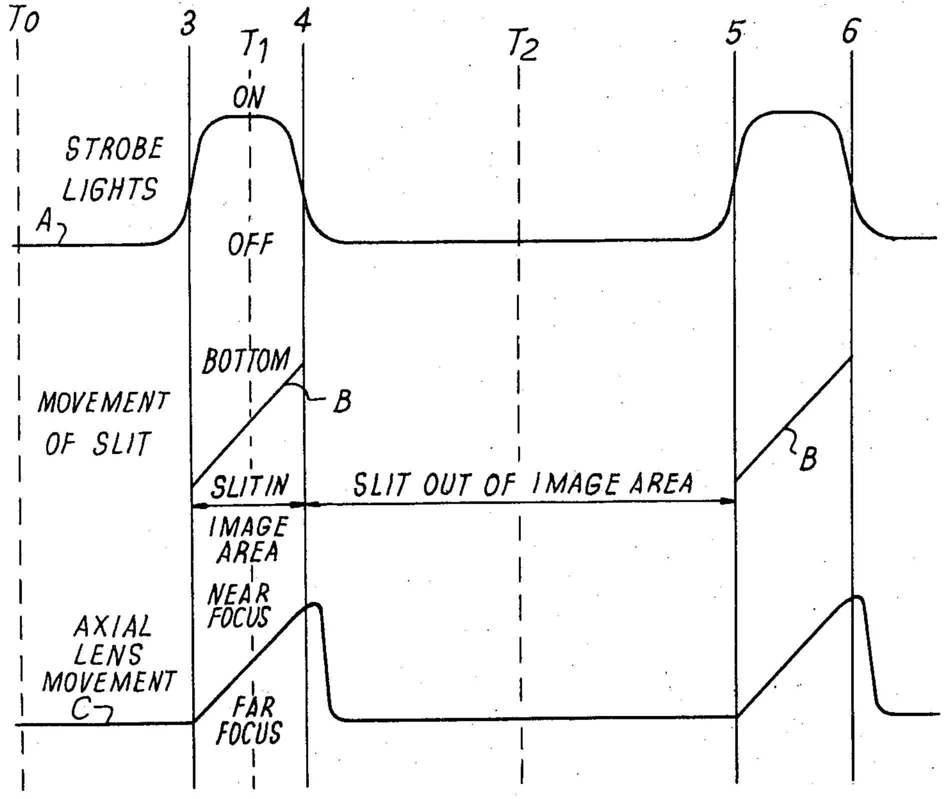
FIG. 4 OPERATION OF STROBE LIGHTS FOCUS SCANNING METHOD

ILLUMINATING AND IMAGING SYSTEM FOR OPTICAL PROBE

This invention relates to optical systems and particularly to means for improving the depth of focus which may be achieved in optical image formation.

The invention is of particular value in image-forming applications in which the optical resolution is nearly diffraction limited, so that the aperture of the optics cannot be reduced to improve the depth of focus, without reduction in the resolution of nominally in-focus parts of the image. The invention is also of particular value in image forming applications in which the aperture of the optics cannot simply be reduced without unacceptable loss of image illumination.

The invention has a particular application in visual display systems, such as are used in ground-based flight simulating apparatus. In such systems, it is common practice to use a model of the terrain to be flown over in simulated flight and to display an image of the model to the trainee crew subject or subjects by way of a closed circuit television system. An image of the model is first formed onto a television camera target by an optical arrangement known as a probe. The entrance pupil of the probe optics is manoeuvred above the model terrain so that the picture relayed to the trainee crew is continuously in the required perspective. Hitherto, a severe problem in design of probe optics has been to achieve adequate depth-of-focus in the probe optics since, when the probe entrace pupil is close to the model surface, parts of the model in the picture foreground may be only a few millimetres from the entrance pupil, while parts of the model seen in the picture background may be some metres from the entrance pupil.

In known visual simulation systems, a considerable degree of defocus is at some time accepted in some part of the field of view. It is usually important that model areas distant from the probe entrance pupil should be imaged with good resolution. Probes are therefore normally focused for distant objects, and model areas close to the probe are allowed to go out of focus. A substantial improvement can be made in the resolution of out-of-focus image areas by reducing the diameter of the probe entrance pupil. However, in known systems, the resolution of the probe optics is nearly diffraction limited and the image illumination is barely sufficient to give an adequate signal to noise ratio in the television camera output signals. Any appreciable simple reduction in entrance pupil diameter is therefore ruled out, since it would give an unacceptable reduction, due to diffraction, in resolution of in-focus image areas, and also reduce image illumination unacceptably.

A method for improving the effective depth-of-focus of an optical system, which does not involve aperture reduction, may be called focus-scanning. Such systems may be used in cases where the object surface is substantially flat, as for example in a flight simulator visual system where the probe optics view a flat model runway. When the object surface is flat, at each region within the optical system where an image is formed, there is a notional plane on which all image points are in good focus. This plane, which we shall call the focus-plane, is tilted with respect to the normal to the optical axis, if the object plane is tilted with respect to the normal to the optical axis. In a simulator probe, the tilt of the focus-plane is sometimes considerable, so that some parts of the image formed on the final target plane are considerably out of focus, since the target plane must be normal to the optical axis.

A flat model surface may in theory be brought into focus over the whole target area by a tilting lens system, but such systems are known to be expensive and have not been found to be completely effective in the most difficult cases, nor to have adequate performance.

In a focus-scanning system an optical element is moved in order to produce an axial movement of the focus-plane in the region of the target surface. The target surface may be, for example, a film plane or a television camera photo-cathode. The moving optical element may be a lens, a curved mirror or a flat mirror. At the line of intersection between the focus plane and the target plane, there is a narrow strip area within which the image formed on the target is in good focus. As the focus-plane is shifted axially, the in-focus strip on the target surface moves across the target surface so that, at different times, each part of the image is in focus on the target. A focus-scanning system includes a mechanism for moving a slit across an image area. The slit runs parallel with the intersection of the focus-plane and target surface, and the movements of the slit and the moving optical element are synchronised so that only the image area instantaneously in focus on the target surface is transmitted to the target. The scanning slit may be set either near the target surface or else at an intermediate image area.

The moving optical element and scanning slit may be vibrated so that the whole of the final image, transmitted during each scanning cycle, is substantially in focus. However, if such a scanning system is used, the time-averaged target illumination is greatly reduced. For this reason, simple focus-scanning systems have not been used in simulator probe optics.

If it were possible to make a substantial increase in the level of model illumination, both aperture reduction and focus-scanning would be practical methods for improving depth-of-focus in probe optics. However it would be highly inconvenient to increase the general level of model illumination by a significant factor, over levels now commonly used.

An object of the present invention therefore is to provide, in the application to flight simulation probes and similar optical imaging apparatus, means for improving the resolution in image areas which would otherwise be out-of-focus, without substantially reducing by diffraction the resolution of in-focus image areas, and without necessitating an increase in the general level of illumination of object areas.

This is done, as is more particularly defined in the next following paragraph, by providing special enhanced illumination for those limited object areas which would otherwise be out-of-focus, and by providing either aperture reduction or a focus-scan associated solely with those areas of special illumination. Thus, normally out-of-focus object areas are provided with enhanced illumination and depth-of-focus improvement means. The depth-of-focus improvement means are not applied to the main object area, which is normally in focus, and enhanced illumination is not therefore required on the main object area. Also, the diffraction limit on resolution is not reduced for the main object areas.

Accordingly, the invention provides an optical imaging system for forming an image of object areas, a first illumination system for providing substantially constant general illumination of the said object areas and a strobed illumination, at a level substantially higher than the general illumination of the object areas, only on limited object areas including object areas near to the optical imaging system, the said optical imaging system including optical means operating cyclically in phase with the intermittent illumination, to modify the said optical imaging system thereby to improve the image definition of the system during periods when the strobed illumination is on.

A high level of model illumination is provided within the object areas in which an improved depth-of-focus is most needed. In a simulator system, the probe is normally focused for distant objects, so that depth-of-focus improvement is strictly necessary only in model areas which happen to be close to the probe. To achieve improved foreground resolution, without altering the probe optics as they affect distant objects time sharing is used between the two processes: background image formation and foreground image formation. During periods when the strobed illumination is off, the probe optics in use are of a conventional kind and are simply focused, via a fairly large entrance pupil, on distant model objects. During periods when the strobed illumination is on, a different probe optical system is used. This second system gives improved depth of focus either by aperture reduction or by focus scanning. It gives low time-averaged transmission but is effective only for the model areas which have a higher illumination level provided by the strobed illumination system. In a flight simulator system, the model area to be illuminated by the strobed illumination system may be many orders smaller than the entire model area, so that the high level of strobed illumination which is required is technically and economically feasible. It will often be convenient, in flight simulator systems, to provide strobed illumination to lights on the model simulating terrain lights, so that these lights are always imaged under improved depth-of-focus conditions even though they are not always in the picture foreground.

In order that the invention may be readily carried into practice, two embodiments thereof will now be described in detail, by way of example, with reference to the accompanying drawings, of which:

FIG. 3 is a timing diagram showing the synchronised strobed illumination and aperture change of the apparatus of FIG. 1; and FIG. 4 is a timing diagram showing the synchronised strobed illumination and slit movement and focus change of the apparatus of FIG. 2.

In the first embodiment of the invention, there is provided an optical imaging system forming an image of object areas and a strobe illumination system providing intermittent illumination at a level substantially higher than the general illumination of object areas, only on limited object areas including object areas near to the imaging system. The imaging system further includes means operating cyclically in phase with the intermittent illumination, to reduce the area of the entrance pupil of the imaging system during periods when the strobe illumination is on.

Figure 1:
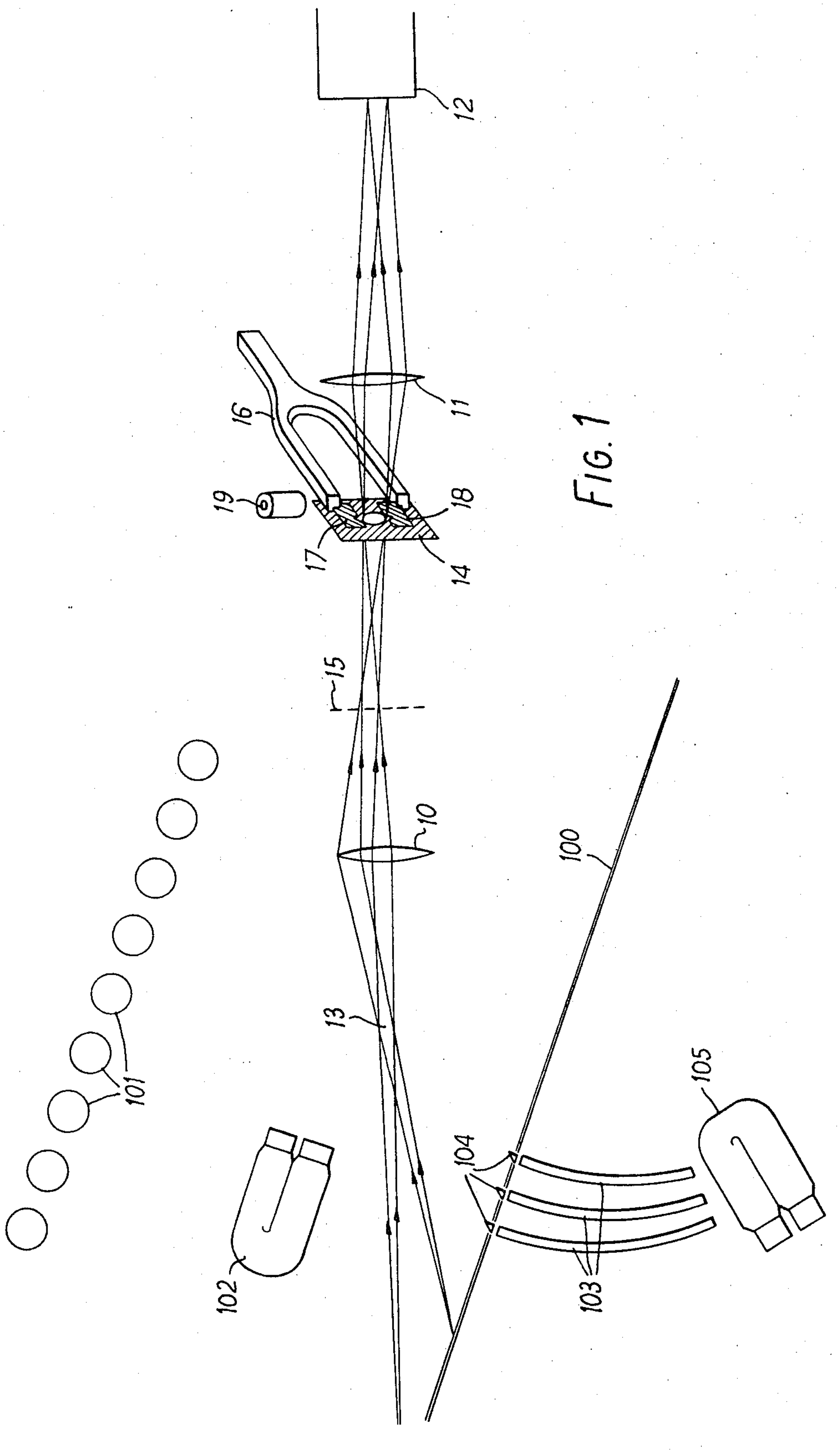
FIG. 1 is a diagram illustrating a first embodiment of the invention.

A practical arrangement according to this first embodiment is illustrated in FIG. 1. In FIG. 1, the optical imaging system is a flight simulator probe consisting essentially of a front lens 10, a relay lens 11 and a television camera tube 12. The system has an external entrance pupil 13, which is imaged by the front lens onto a stop 14 which, by its position and diameter, determines the effective position and diameter of the entrance pupil. The front lens forms a primary image of the field of view near its rear focal plane 15. This image is relayed by the relay lens onto the television camera target. The aperture reducing mechanism is set close to the stop. The mechanism consists essentially of a tuning fork 16, with opaque leaves 17 and 18 attached to its vibrating prongs. The tuning fork 16 is actuated by an electro-magnet 19. As the prongs move together, the leaves 17 and 18 obtrude into the optical aperture defined by the stop, substantially reducing the effective size of the entrance pupil. The leaves 17 and 18 are notch-shaped, as shown in the figure, to reduce the entrance pupil shape to a square. The leaves 17 and 18 are set so that the optical aperture is reduced only for a small proportion of each vibration cycle, as shown in FIG. 3.

The probe shown in FIG. 1 forms an image of a model 100. The model 100 is illuminated over most of its area by a stationary arrangement of fluorescent strip lamps 101. The illumination provided by the strip lamp arrangement is substantially constant with time. The area of the model in the immediate vicinity of the probe is illuminated predominantly by a Xenon arc strobe lamp 102 which is very bright compared with the fluorescent strip lamps 101 and which is attached to the mechanical structure of the probe close to the probe entrance pupil. Relatively little illumination is provided by the fluorescent strip lamps 101 on model areas close to the probe, due to the shading effect of the probe mechanical structure and of the strobe lamp 102.

Lights in the simulated terrain, including runway lights, are simulated on the model by use of fibre optic light guides 103, terminating at small prisms 104, set into the model surface. The prisms 104 are illuminated via the light guides 103 by a second Zenon arc strobe lamp 105.

The strobe lamps 102 and 105 are pulsed at the vibration frequency of the tuning fork 16 and the strobed illumination is kept in phase with the cyclic aperture reduction provided by the tuning fork arrangement. The strobe lamps 102 and 105 are pulsed for brief periods in each tuning fork vibration cycle, coinciding with the brief periods in each cycle during which the aperture of the optical imaging system is reduced, as shown in FIG. 3. Thus, while the aperture of the optical system is reduced, model areas close to the probe and also simulated terrain lights are very brightly illuminated by the strobe lamps. But while the aperture of the optical system is relatively large, little light falls on the parts of the model close to the probe, due to shading by the probe and lamp 102, and the simulated terrain lights are not illuminated. Therefore, the larger proportion of light falling onto the television camera target, in image areas associated with model areas close to the probe and with simulated terrain lights, falls onto the target via a small optical aperture. Parts of the model remote from the probe receive relatively little illumination from the strobe lights so that, during periods of aperture reduction, little light from these areas reaches the target. The larger proportion of light falling onto the television camera target, in image areas associated with model areas other than terrain lights and not close to the probe, falls on the target via a relatively large optical aperture. The probe is nominally focused for model areas remote from the probe.

In FIG. 3, curve A shows the illumination of the strobed lamps 102 and 105 and curve B shows the variation of the aperture at stop 14 effected by the leaves 17 and 18. A single period of vibration of the prongs of the tuning fork 16 is represented by the time interval T0 to T2, the instants T0 and T2 representing consecutive instants when the prongs are at maximum divergence and the instant T1 corresponding to the instant of maximum convergence.

The strobed lights 102 and 105 are switched "on" between the time intervals 3–4 and 5–6. The notched faces of the leaves 17 and 18 reduce the aperture at stop 14 during these same time intervals. Obviously, the time intervals 3–5 and 4–6 also correspond to the vibration period T0-T2 of the tuning fork prongs.

The arrangement of FIG. 1 permits remote, in-focus image areas to be imaged through a large aperture, with the advantages of good light-gathering efficiency and good diffraction limited resolution. The arrangement provides improved depth-of-focus, associated with a reduced optical aperture, for selected model areas including the nominally out-of-focus area close to the probe.

In the second embodiment of the invention, there is provided an optical imaging system forming an image of object areas and a strobed illumination system providing intermittent illumination, at a level substantially higher than the general illumination of object areas, only on limited object areas including object areas near to the imaging system. The imaging system includes a focus-scanning mechanism operating cyclically in phase with the strobed illumination and effective when the strobed illumination is "on," to improve the depth of focus of the imaging system.

The focus-scanning mechanism consists essentially of two parts, first, a device for scanning a slit across an image of the field of view and, second, a device for shifting the axial position of the focus-plane so that the part of the image transmitted by the slit is always in focus at the final image surface.

Figure 2:
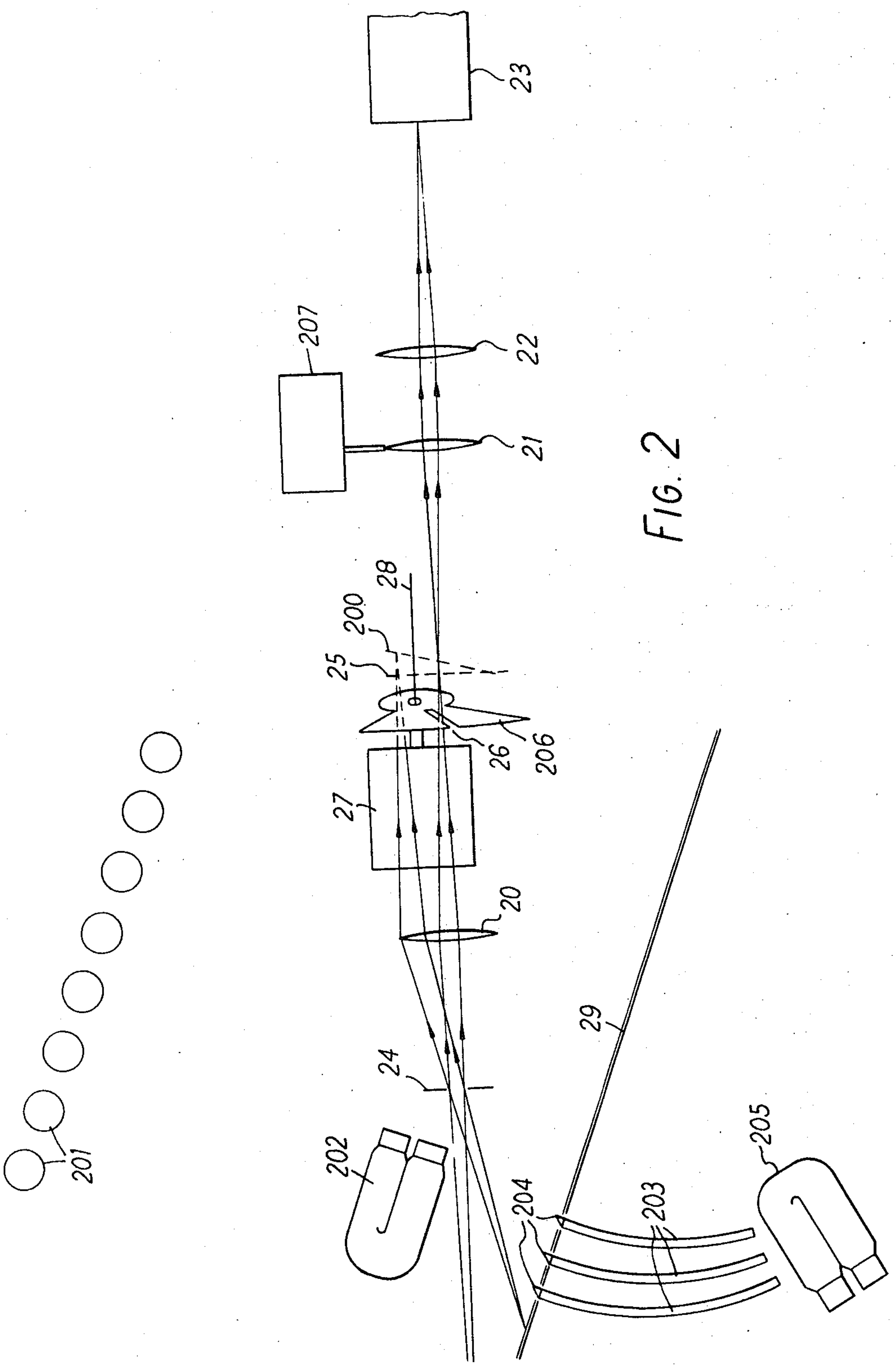
FIG. 2 is a similar diagram illustrating a second embodiment of the invention.

A practical arrangement according to this second embodiment is illustrated in FIG. 2. As in the practical arrangement described with reference to FIG. 1, the optical imaging system is a flight simulator probe. The probe optics consist essentially of a front lens 20, a movable lens 21, a relay lens 22 and a television camera tube 23. The front lens 20, which has an external entrance pupil 24 at its front focal plane, forms a primary image of the field of view at or close to its rear focal plane 25. The movable lens 21 is moved along the optical axis by a moving coil linear actuator 207. An image-plane scanning device 206 is set to scan in or near the plane 25. The image plane scanning device 206 is an opaque sector with a narrow transparent radial slit 26. The sector is rotated at a steady speed by a motor 27 about an axis 28 normal to the sector and passing through the centre of the circle of which it is a sector. The axis 28 is set parallel to the optical axis on which the lenses lie, so that, for brief periods during each sector rotation, the sector passes normally through the light beam, absorbing the light associated with th primary image except where the light passes through the transparent slit.

The model surface 29 in FIG. 2, is substantially flat. The primary image surface is therefore also substantially flat but, since the model surface is not generally normal to the optical axis of the probe, the focus plane 200 is tilted with respect to the rear focal plane 25. The axis 28 of the sector is positioned with respect to the optical axis so that the transparent slit 26, as it scans through the light, lies substantially parallel to the intersection of the image surface 200 with the rear focal plane 25.

In this way, it is arranged that at each instant during the scan the slit 26 transmits light associated with a narrow band of image points which are all focused at approximately the same distance from the rear focal plane 25. During the slit scan, the focal position of transmitted image elements shifts at a constant speed in the direction of the optical axis.

The movable lens 21 is held stationary during the periods in each sector rotation when the sector is out of the light. During these periods, the lens 21 is held at its own focal length from the rear focal plane 25 of the front lens, collimating light associated with model areas distant from the probe.

As the transparent slit passes through the light, the movable lens 21 is shifted axially away from the front lens 20 at a substantially constant speed. The speed of the lens movement is controlled, so that the lens 21 is at all times its own focal distance away from that part of the focus-plane which is transmitted by the slit 26. Thus, light transmitted through the slit 26 is always collimated by the moving lens 21. After the slit 26 leaves the light, but while the opaque sector still obscures the light, the movable lens 21 is returned to its rest position by the actuator 207. The relay lens 22 is set at its focal length away from the television camera tube target, so that collimated light received from the movable lens 21 is focused on the target of the camera tube 23.

As in the practical arrangement described with reference to FIG. 1, the model is illuminated over most of its area by fluorescent lamps 201, in FIG. 2, but, in the immediate vicinity of the probe, by a relatively very bright Xenon arc strobe lamp 202.

Again, lights in the simulated terrain are simulated on the model by the use of fibre optic light guides 203, in FIG. 2, with small prisms 204 set into the model surface, illuminated by a second Xenon arc strobe lamp 205. The area of model close to the probe receives relatively little light from the fluorescent strip lamps 201, due to the shading effect of the probe mechanical structure and of the Xenon arc strobe lamp 202. This model area, and the simulated terrain lights, are therefore illuminated predominantly by the strobe lamps 202 and 205, respectively, while other model areas are illuminated predominantly by the fluorescent strip lamps 201, which give a level of illumination substantially constant with time.

The strobe lamps 202 and 205 are pulsed at the frequency of rotation of the opaque sector 206, and the strobe illumination is kept in phase with the image scan provided by the sector 206, as shown in FIG. 4. Thus, the strobed illumination is "on" during the brief periods in each rotation cycle when the transparent slit 26 is scanning through the beam. The strobed illumination is "off" during the longer periods in each cycle when the opaque sector is out of the beam.

Images of model areas close to the probe and of simulated terrain lights are therefore formed mainly in light transmitted through the slit 26, and these image areas are all well focused by the ganged scanning actions of the slit 26 and the movable lens 21. Images of other model areas are formed mainly in light transmitted through the movable lens 21 in its rest position, when the light is not interrupted by the sector 26. Thus, for these model areas, the probe is effectively focused simply on distant objects, but the light collection efficiency of the probe is relatively good.

No enhancement of the general model lighting 201 is required since, for the main model area, the probe has good light collection efficiency. For the limited model areas for which improved depth of focus is particularly desirable, the focus scanning means is effective.

In FIG. 4, curve A shows the illumination of the strobed lamps 202 and 205 of FIG. 2, the inclined lines B show the movement of the slit 26 and the curve C shows the movement of the lens 21.

A single period of rotation of the scanning device 206 is represented by the time interval T0 - T2. The time T1 represents the instant when the slit 26 has reached the mid point of its scan.

The strobed lights 202 and 205 are switched "on" between the time intervals 3–4 and 5–6. The slit 26 performs its scan of the beam during the same intervals. During these same intervals, also, the lens 21 is moved by the actuator 207 from distant-focus to near-focus. The position of lens 21 is restored to distant-focus immediately after the instants 4 and 6, as shown by the curve C.

In the two practical arrangements described above, with reference to the drawings, some parts normally incorporated in flight simulator probe optics have been omitted for simplicity from the description and from the diagrams of FIGS. 1 and 2. These parts, which are required for simulation of sky and for simulation of the visual effects of pitch and roll manoeuvres, do not form a part of the present invention and may follow known practice.

What we claim is:

1. For a display system including an optical probe for movement over and for viewing a terrain model, an optical imaging system, included in the said optical probe, for forming a primary image and a secondary image of object areas of the model, said object areas including a foreground area and a more distant area, a first illumination system for providing substantially uniform general illumination of both the said foreground and more distant object areas and a strobed illumination system for providing intermittent illumination of the said foreground area at a level higher than the said general illumination, said optical imaging system comprising a front lens and a relay lens, the said front lens providing the said primary image and the said relay lens relaying the said primary image to form the said secondary image, whereby bundles of light rays pass between the said front and relay lenses, and a movable mechanical means, disposed between the said front and relay lenses and having a light ray obscuring area and a light ray transmitting area, which is moved in synchronism with the said strobed illumination so as to obscure selected ray bundles, and to transmit selected other ray bundles to the said relay lens during activation of the said strobed illumination.

2. For a display system including an optical probe for movement over and for viewing a terrain model, an optical imaging system, included in the said optical probe, for forming a primary image and a secondary image of object areas of the model, said object areas including a foreground area and a more distant area, a first illumination system for providing substantially uniform general illumination of both the said foreground and more distant object areas and a strobed illumination system for providing intermittent illumination of the said foreground area at a level higher than the said general illumination, said optical imaging system comprising a front lens and a relay lens, the said front lens providing the said primary image and the said relay lens relaying the said primary image to form the said secondary image, whereby bundles of light rays pass between the said front and relay lenses, movable mechanical means, disposed between the said front and relay lenses and having a light ray obscuring area and a light ray transmitting area, which is moved in synchronism with the said strobed illumination so as to obscure selected ray bundles, and to transmit selected other ray bundles to the said relay lens during activation of the said strobed illumination, said mechanical means including an apertured opaque plate defining an optical stop and having at least one complementary opaque leaf cyclically movable into and out of the aperture area to reduce the aperture when the strobed illumination is activated.

3. For a display system including an optical probe for movement over and for viewing a terrain model, an optical imaging system, included in the said optical probe, for forming a primary image and a secondary image of object areas of the model, said object areas including a foreground area and a more distant area, a first illumination system for providing substantially uniform general illumination of both the said foreground and more distant object areas and a strobed illumination system for providing intermittent illumination of the said foreground area at a level higher than the said general illumination, said optical imaging system comprising a front lens and a relay lens, the said front lens providing the said primary image and the said relay lens relaying the said primary image to form the said secondary image, whereby bundles of light rays pass between the said front and relay lenses, movable mechanical means, disposed between the said front and relay lenses and having a light ray obscuring area and a light ray transmitting area, which is moved in synchronism with the said strobed illumination so as to obscure selected ray bundles, and to transmit selected other ray bundles to the said relay lens during activation of the said strobed illumination, the said mechanical means including a rotatable scanner having at least an opaque sector having a radial slot therein which defines a light-transmitting slit, the said scanner being rotated synchronously with the said strobed illumination so that the said slit transmits ray bundles from the said foreground area when the strobed illumination is activated.

4. An optical system as claimed in claim 1, in which the general illumination of object areas is provided by fluorescent strip lighting.

5. An optical system as claimed in claim 1, in which the strobed illumination is provided by at least one gas-discharge arc lamp.

6. An optical system as claimed in claim 2, in which the said mechanical means includes a tuning fork and electro-magnet means for vibrating the tuning fork in synchronism with the said strobed illumination, one prong of the said tuning fork carrying the said one opaque leaf.

7. An optical system as claimed in claim 6, in which both prongs of the said tuning fork carry notched opaque leaves with facing notches positioned to partially obscure the aperture of the said stop when the said prongs are vibrated towards each other and to uncover the aperture of the said stop when the said prongs are vibrated away from each other.

8. An optical system as claimed in claim 3, in which the said scanner is rotated by motor means so that the said slit scans the primary image in the vertical direction thereof.

9. An optical system as claimed in claim 8, having a movable lens and linear motor means for moving axially the said lens to maintain in focus the object area scanned by the said slit as the said scanner rotates.

10. An optical imaging system as claimed in claim 1, in which the said object areas include local optical means providing light-emitting points, the emitted light being intermittent and operative in synchronism with the said strobed illumination.

11. An optical imaging system as claimed in claim 10, in which the local light-emitting optical means comprise small prisms illuminated each by a fiber optic light guide from a gas discharge arc lamp strobed in synchronism with the said strobed illumination.

* * * * *